US007786714B2

(12) United States Patent
Bacchi et al.

(10) Patent No.: US 7,786,714 B2

(45) Date of Patent: Aug. 31, 2010

(54) VOLTAGE CONVERTER APPARATUS AND METHOD THEREFOR

(75) Inventors: Matthew Bacchi, Saveres (FR); Vincent Teil, Ramonville St. Agne (FR)

(73) Assignee: Freescale Semiconductor, Inc., Austin, TX (US)

( * ) Notice: Subject to any disclaimer, the term of this patent is extended or adjusted under 35 U.S.C. 154(b) by 277 days.

(21) Appl. No.: 11/910,367

(22) PCT Filed: Apr. 1, 2005

(86) PCT No.: PCT/EP2005/005036

§ 371 (c)(1), (2), (4) Date: Oct. 1, 2007

(87) PCT Pub. No.: WO2006/102931

PCT Pub. Date: Oct. 5, 2006

(65) Prior Publication Data

US 2008/0203989 A1 Aug. 28, 2008

(51) Int. Cl.
*G05F 1/40* (2006.01)

(52) U.S. Cl. ...................................... 323/282; 323/272

(58) Field of Classification Search ......... 323/282–290, 323/222, 224, 274; 307/11, 33, 34; 363/16–20, 363/131, 65, 26
See application file for complete search history.

(56) References Cited

U.S. PATENT DOCUMENTS

| | | | | |
|---|---|---|---|---|
| 5,568,044 | A * | 10/1996 | Bittner | 323/272 |
| 6,621,256 | B2 * | 9/2003 | Muratov et al. | 323/282 |
| 2002/0158613 | A1 | 10/2002 | Muratov et al. | |
| 2003/0218894 | A1 | 11/2003 | Utsumoiya | |
| 2004/0141341 | A1 | 7/2004 | Higashitani | |

FOREIGN PATENT DOCUMENTS

| | | |
|---|---|---|
| EP | 1239574 B1 | 5/2007 |

* cited by examiner

*Primary Examiner*—Rajnikant B Patel

(57) ABSTRACT

In the field of step-down voltage conversion, it is known to regulate an output of a DC-DC converter circuit with both a Pulse Wave Modulation voltage signal or a Pulse Frequency Modulation voltage signal, depending upon a current demand made upon the DC-DC converter circuit. Typically, circuits to generate both voltage signals are provided and selection of the appropriate regulation mode is achieved by means of a pin and decision software controlling the pin. However, the use of the pin and the software is an overhead that is desirably avoided. Consequently, the present invention provides a voltage conversion apparatus comprising a signal analyzer to analyze a load current signal and compare a characteristic of the load current signal to at least one predetermined criterion. Regulation by the PWM signal or the PFM signal is selected in response to the evaluation of the comparison with the at least one criterion.

19 Claims, 2 Drawing Sheets

VOLTAGE CONVERTER APPARATUS AND METHOD THEREFOR

FIELD OF THE INVENTION

This invention relates to a voltage converter apparatus of the type, for example, that converts an input voltage to an output voltage, the output voltage being lower than the input voltage. This invention also relates to a method of voltage conversion.

BACKGROUND OF THE INVENTION

It is known to equip electronic devices with so-called step-down voltage converters. Particularly, but not exclusively, in relation to portable electronic devices, the provision of the step-down converters serves to improve efficiency of an electronic system employed by the device, thereby increasing cycle time of a battery used by the device.

However, some electronic devices have a number of modes of operation, each mode having different power consumption requirements, for example, a radio-frequency communications apparatus can have an active mode and a standby mode, each mode having a distinctive loading regime. Also, it has been recognised that inefficiencies arise when a single voltage regulation scheme is employed to satisfy current demands associated with the different power consumption requirements. In this respect, a pulse frequency modulation scheme is preferable for low power demand modes and a pulse width modulation scheme is preferable for higher power demand modes to maintain maximum battery lifetime. Consequently, known step-down voltage conversion circuitry typically employs a first pulse frequency modulation circuit and a second pulse width modulation circuit to control an output power signal, the first circuit being selectable in preference to the second circuit and vice versa in response to a software-controlled “pin”, such as a terminal of an integrated circuit. The software determines the mode of operation of the device and sends a control signal to the pin to select the first or second circuit to control the output power signal.

However, the provision of the control pin and the software adds a level of complexity, and hence an overhead, to the step-down voltage converter that is desirable to be avoided.

STATEMENT OF INVENTION

According to the present invention, there is provided a voltage converter apparatus and a method of voltage conversion as set forth in the appended claims.

BRIEF DESCRIPTION OF THE DRAWINGS

At least one embodiment of the invention will now be described, by way of example only, with reference to the accompanying drawings, in which.

DESCRIPTION OF PREFERRED EMBODIMENTS

Figure 1:
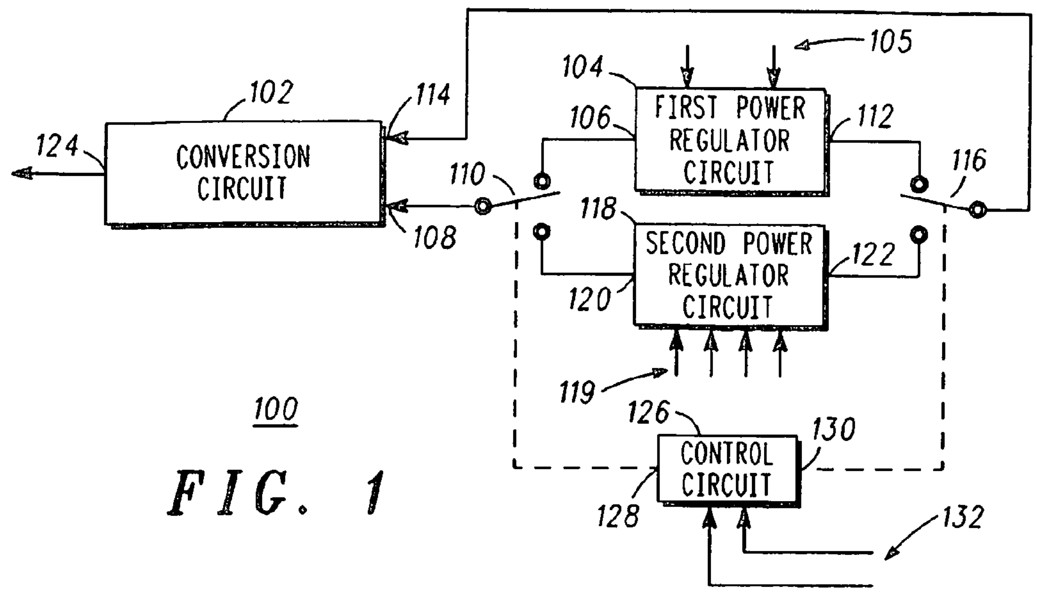
FIG. 1 is a schematic diagram of an apparatus constituting an embodiment of the invention.

Throughout the following description identical reference numerals will be used to identify like parts.

Referring to FIG. 1, a voltage converter apparatus 100 comprising a step-down voltage conversion circuit 102 coupled to a first power regulation circuit 104 having a first control output terminal 106 coupled to a first control input terminal 108 of the conversion circuit 102 via a first switching device 110. A second control output 112 is coupled to a second control input 114 via a second switching device 116.

A second power regulation circuit 118 is also provided and comprises a third control output terminal 120 coupled to the first control input terminal 108 of the conversion circuit 102 via the first switching device 110. The second power regulation circuit 118 also comprises a fourth control output terminal 122 coupled to the second control input terminal 114 via the second switching device 116.

The conversion circuit 102 is a so-called “Buck converter”, a DC-DC step-down voltage converter comprising an inductor, a capacitor, input terminals and output terminals, as well as a first switch and a second switch, such as a first Metal Oxide Semiconductor Field Effect Transistor (MOSFET) and a second MOSFET. Since the detailed structure of the Buck converter is known in the art, no further details will be described herein for the sake of conciseness and clarity of description.

In this example, the first power regulation circuit 104 is a Pulse Width Modulation (PWM) signal generation circuit capable of generating a first drive signal at the first control output terminal 108 and a second drive terminal at the second control output terminal 112. The first and second drive signals serve to regulate an output signal at an output terminal 124 of the conversion circuit 102 in accordance with a PWM scheme. In this respect, the first and second drive signals constitute a PWM regulation signal. More specifically, the PWM signal generation circuit is in a Discontinuous Current Mode (DCM). To enable the first power regulation circuit 104 to control the output signal, the first power regulation circuit 104 comprises a number of input terminals 105 for receiving control signals. In contrast, the second power regulation circuit 118 is a Pulse Frequency Modulation (PFM) circuit capable of generating a third drive signal at the third control output terminal 120 and a fourth drive signal at a fourth control output terminal 122. The third and fourth drive signals serve to regulate the output signal at the output terminal 124 in accordance with a PFM scheme. In this respect, the first and second drive signals constitute a PFM regulation signal. To enable the second power regulation circuit 118 to control the output signal, the second power regulation circuit 118 comprises a number of input terminals 119 for receiving control signals. Since circuits of these types are known in the art relating to regulation of DC-DC conversion circuits, the power regulation circuits 104, 118 will not be described in any further detail herein for the sake of conciseness and clarity of description.

In order to control the first and second switching devices 110, 116, a control circuit 126 is provided. A fifth control output terminal 128 of the control circuit 126 is coupled to an input (not shown) of the first switching device 110 to control activation thereof and a sixth control output terminal 130 of the control circuit 126 is coupled to an input (not shown) of the second switching device 116 to control activation thereof.

In order to control application of the first and second drive signals and the third and fourth drive signals generated by the first and second power regulation circuits 104, 118, the control circuit 126 comprises a number of input terminals 132.

Figure 2:
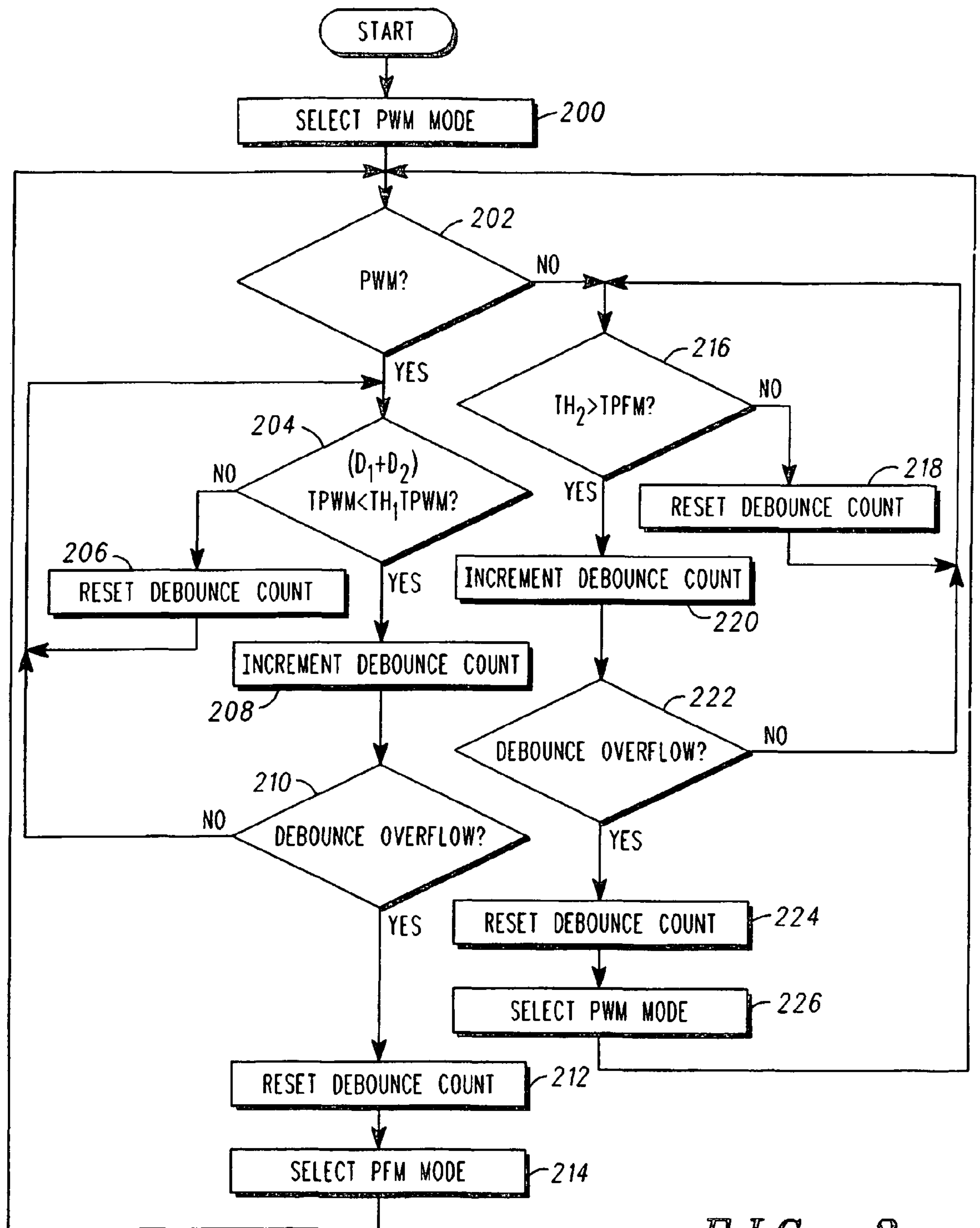
FIG. 2 is a flow diagram of a method for use with the apparatus of FIG. 1.

In operation (FIG. 2), the control circuit 126 is arranged to analyse a load current signal with respect to other parameters in order to determine whether the converter apparatus 100 should be in a PWM regulation mode or a PFM regulation mode. In the PWM regulation mode, generation of the output signal by the conversion circuit 102 is controlled by the PWM regulation signal of the first power regulation circuit 104, and in the PFM regulation mode, generation of the output signal by the conversion circuit 102 is controlled by the PFM regulation signal of the second power regulation circuit 104.

Prior to making the above-described determination, the control circuit 126 first initialises (Step 200) the first and second switching devices 110, 116 into a state whereby the first and second control output terminals 106, 112 are respectively coupled to the first and second control input terminals 108, 114 of the conversion circuit 102. Consequently, the PWM regulation signal, applied through the first and second drive signal, controls the output signal generated by the conversion circuit 102. The control circuit 126 then, as a matter of course, determines (Step 202) whether the converter apparatus 100 is in a PWM regulation mode.

Figure 3:
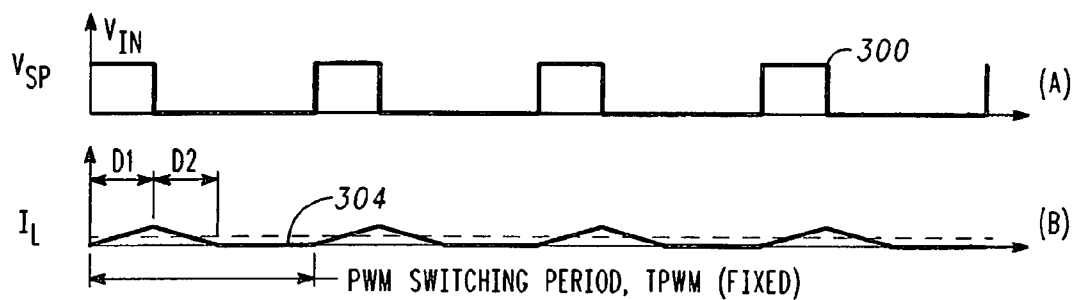
FIG. 3A is a graph of regulation voltage signal against time generated by a first operational unit of the apparatus of FIG. 1.
FIG. 3B is a graph of a load current signal associated with the regulation voltage signal of FIG. 3A.
Figure 4:
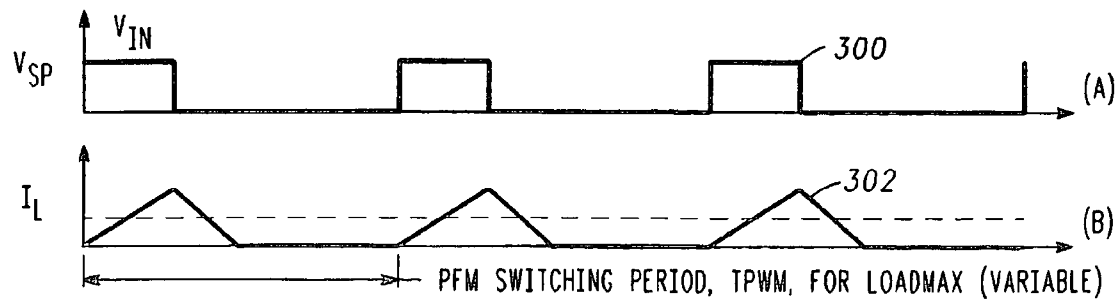
FIG. 4A is a graphs of regulation voltage signal against time generated by a second operational unit of the apparatus of FIG. 1.
FIG. 4B is a graph of a load current signal associated with the regulation voltage signal of FIG. 4A.

Since the converter apparatus 100 has just been initialised into the PWM regulation mode, the control circuit 126 proceeds to determine whether the demand on the load current is sufficiently low to merit PFM regulation of the output signal in place of PWM regulation thereof. Consequently, the control circuit 126 measures, as a proportion of an overall period of the load current signal, a first upwardly ramping part, D1, of the load current signal 302 (FIG. 3A). The load current signal can be obtained, for example, by calculating an average current flowing through the inductor (not shown) of the conversion circuit 102 using a priori knowledge of the average values of salient components forming the conversion circuit 102 and knowledge of the PWM regulation signal. In this respect, referring to FIG. 3A, a switching point voltage, $V_{SP}$, at a switching node of the conversion circuit 102 varies with time in accordance with the PWM regulation signal to form a switching point voltage signal 300. Turning to FIG. 3B, the calculated load current signal 302 is in synchronism with the switching point voltage signal 300.

The control circuit 126 also measures, as a proportion of the overall period of the load current signal, a second and subsequent downwardly ramping part, D2, of the load current signal 302, the upwardly and downwardly ramping parts of the load current signal 302 in practice being induced, in this example, through application of the PWM regulation signal. During a period of the PWM regulation signal, a remaining part of the load current signal 302 is substantially zero, corresponding to, for example, a depletion time 304 of the inductor mentioned above. In order to determine when, in the period of the load current signal 302, i.e. in time, the second downwardly ramping part, D2, of the load current signal 302 terminates (and the depletion time begins), the sum of the measured proportions that the first and second parts, D1 and D2, of the load current signal 302 constitute are multiplied by the period of the PWM voltage signal, Tpwm, to yield a load current pulse time (D1+D2)Tpwm. Thereafter, the load current pulse time is compared with a predetermined criterion, in this example, a threshold value. The threshold value is, in this example, a percentage of the period of the load current signal 300, such as 75%. Consequently, the control circuit 126 determines (Step 204) whether the duration of the load current pulse time is less than the temporal equivalent of the 75% threshold value ($Th_1$Tpwm). If the load current pulse time is greater than the 75% threshold, then a sufficiently large current demand is deemed to be being made by a load (not shown) to make operation of the converter apparatus 100 in the PWM regulation mode appropriate. Consequently, a debounce counter, $C_{debounce}$, is reset (Step 206) and the control circuit 126 continues analysing the load current signal as already described above until the load current pulse time is found to be less than the 75% threshold value. When the load current pulse time is found to be less than the 75% threshold value, the debounce counter, $C_{debounce}$, is incremented (Step 208) by unity and the control circuit 126 verifies whether or not (Step 210) the debounce counter, $C_{debounce}$, has exceeded an overflow limit, for example, six. The debounce counter, $C_{debounce}$, is provided as a way of verifying that the load current pulse time is consistently less than the threshold value. Therefore, the control circuit 126 continues analysing the load current signal 302 as already described above until the load current pulse time is found to be less than the 75% threshold value on six consecutive occasions. When the load current pulse time is found (Step 210) to be consistently less than the 75% threshold value, the debounce counter, $C_{debounce}$, is reset (Step 212) and the control circuit 126 is set (Step 214) to the PFM regulation mode 214. The control circuit 126 then sets the first and second switching devices 110, 116 so that the second power regulation circuit 118 is coupled to the conversion circuit 102, thereby causing the output signal to be regulated by the third and fourth drive signals applying the PFM regulation signal. Thereafter, the control circuit 126 returns to determining (Step 202) whether the converter apparatus 100 is in the PWM regulation mode.

Since the control circuit 126 has now set the converter apparatus 126 to the PFM regulation mode, the control circuit 126 determines (Step 202) that the converter apparatus 100 is not in the PWM regulation mode and proceeds to determine whether the load current demand is sufficiently high to merit PWM regulation of the output signal in place of PFM regulation thereof.

Consequently, the control circuit 126 measures a PFM switching period, Tpfm, for the load current signal 302 (FIG. 3B) and compares the PFM switching period with another predetermined criterion, for example, a threshold value. In the present example, the threshold value is a predetermined time period, $Th_2$, the PFM switching period being less than the predetermined time period being indicative that a sufficiently large load current demand is being made to merit the use of PWM regulation. In this respect, the PFM switching period is measured against the predetermined time period, $Th_2$, such as 30 μs. If the control circuit 126 determines (Step 216) that the predetermined time period is less than the PFM switching period, Tpfm, the control circuit 126 resets (Step 206) the debounce counter, $C_{debounce}$, and then continues to analyse the load current signal as already described above until the predetermined time period is found (Step 216) to be greater than the PFM switching period, Tpfm. When the predetermined time period is found to be greater than the PFM switching period, Tpfm, the debounce counter, $C_{debounce}$, is incremented (Step 220) by unity and the control circuit 126 verifies whether or not (Step 222) the debounce counter, $C_{debounce}$, has exceeded the overflow limit, for example, six. Again, the debounce counter, $C_{debounce}$, is provided as a way of verifying that the predetermined time period is consistently greater than the PFM switching period, Tpfm. Therefore, the control circuit 126 continues analysing the load current signal 302 as already described above until the predetermined time period is found to be greater than the PFM switching period, Tpfm, on six consecutive occasions.

When the predetermined time period is found (Step 210) to be consistently greater than the PFM switching period, Tpfm, the debounce counter, $C_{debounce}$, is reset (Step 224) and the control circuit 126 is set (Step 226) to the PWM regulation mode 214. The control circuit 126 then sets the first and second switching devices 110, 116 so that the first power regulation circuit 118 is coupled to the conversion circuit 102, thereby causing the output signal to be regulated by the first and second drive signals applying the PWM regulation signal. Thereafter, the control circuit 126 returns to determining (Step 202) whether the converter apparatus 100 is in the PWM regulation mode.

Of course, the load current pulse time and the percentage threshold value respectively correspond to a first loading current threshold, $I_{loadmin(pwm)}$, and a second loading current threshold, $I_{loadmax(pfm)}$, associated with a need for the output signal to be regulated by the PWM regulation signal or the PFM regulation signal. The first loading current threshold, $I_{loadmin(pwm)}$, and the second loading current threshold, $I_{loadmax(pfm)}$, are respectively set so that they do not overlap, for different possible tolerances of the devices forming the conversion circuit 102 and possible variances in an input voltage to the conversion circuit 102, in order to provide stable transitions between the PWM regulation mode and the PFM regulation mode in a hysteretic manner.

The above process is then repeated, the converter apparatus 100 switching between the PWM regulation mode and the PFM regulation mode in response to the demand for load current. In this example, the converter apparatus 100 is provided in a portable communications device, such as a cellular telephone handset. However, it should be appreciated that other electronic devices can also make use of the converter apparatus 100 descried herein. In any event, the switching of the converter apparatus 100 between PWM and PFM switching modes preserves the cycle time of a battery used by the portable communications device.

Since the above-described converter apparatus 100 is usually part of a highly sophisticated digital system, for example the portable communications device mentioned above, high-frequency clock signals are available for determining the above described inequalities (Steps 204, 216), although dedicated clock-generation circuits can be provided. The clock signals are several multiples of the PWM and PFM periods and so the clock signals can be used to trigger counters, evaluation of the above described inequalities (Steps 204, 216) being by way of a counter-based measurement system.

It is thus possible to provide a voltage converter apparatus and a method therefor capable of automatically selecting one of the regulation modes for a step-down converter in response to current load demand. The need for a control pin and associated control software, an overhead, is thereby obviated.

The invention claimed is:

1. A voltage converter apparatus, the apparatus comprising:

a first output controller to control, when in use, a form of an output signal in accordance with a first voltage regulation scheme, the first voltage regulation scheme comprising a pulse width modulation scheme;

a second output controller to control, when in use, the form of the output signal in accordance with a second voltage regulation scheme, the second voltage regulation scheme comprising a pulse frequency modulation scheme;

a signal analyser to analyze a load current signal associated with the output signal to determine a load current pulse time representing a sum of a rising period of the load current signal and a falling period of the load current signal divided by a period of the pulse width modulation scheme; and a selector coupled to the signal analyser, the selector to switch, when in use, between control of the form of the output signal by the first output controller and the second output controller in response to a relationship between the load current pulse time and a first threshold.

2. An apparatus as claimed in claim 1, wherein the selector is to switch from control of the form of the output signal by the first output controller to control of the form of the output signal by the second output controller in response to the load current pulse time being less than the first threshold.

3. An apparatus as claimed in claim 2, wherein the selector is arranged to switch from control of the form of the output signal by the second output controller to control of the form of the output signal by the first output controller in response to the load current pulse time exceeding the first threshold.

4. An apparatus as claimed in claim 1, wherein the first output controller is a pulse wave modulation control circuit in a discontinuous conduction mode.

5. A method of voltage conversion, the method comprising:

selectively controlling a form of an output signal in accordance with a first voltage regulation scheme, the first voltage regulation scheme comprising a pulse width modulation scheme;

selectively controlling the form of the output signal in accordance with a second voltage regulation scheme, the second voltage regulation scheme comprising a pulse frequency modulation scheme;

analysing a load current signal associated with the output signal to determine a load current pulse time representing a sum of a rising period of the load current signal and a falling period of the load current signal divided by a period of the pulse width modulation scheme; and selecting between control of the form of the output signal in accordance with the first voltage regulation scheme and the second voltage regulation scheme in response to a relationship between the load current pulse time and a first threshold.

6. A method as claimed in claim 5, further comprising:

switching from control of the form of the output signal in accordance with the first voltage regulation scheme to control of the form of the output signal in accordance with the second voltage regulation scheme in response to the load current pulse time being less than the first threshold.

7. A method as claimed in claim 6, further comprising:

switching from control of the form of the output signal in accordance with the second voltage regulation scheme to control of the form of the output signal in accordance with the first voltage regulation scheme in response to the load current pulse time exceeding the first threshold.

8. A voltage converter apparatus, the apparatus comprising:

a first output controller to control, in a first operating mode, a form of an output signal in accordance with a first voltage regulation scheme, the first voltage regulation scheme comprising a pulse width modulation scheme;

a second output controller to control, in a second operating mode, the form of the output signal in accordance with a second voltage regulation scheme, the second voltage regulation scheme comprising a pulse frequency modulation scheme;

a signal analyzer to analyze a load current signal associated with the output signal; and a selector coupled to the signal analyzer, the selector to switch from the first operating mode to the second operating mode in response to the load current signal satisfying a first predetermined criterion on multiple consecutive occasions, and to switch from the second operating mode to the first operating mode in response to the load current signal satisfying a second predetermined criterion on multiple consecutive occasions;

wherein the first predetermined condition comprises a load current pulse time exceeding a first threshold value, the load current pulse time being calculated as a sum of a rising period of the load current signal and a falling period of the load current signal divided by the period of the pulse width modulation scheme; and wherein the second predetermined condition comprises a pulse frequency modulation switching period of the load current signal exceeding a second threshold.

9. The apparatus of claim 8 wherein the load current signal is based on an average current flowing through an inductor associated with the conversion circuit.

10. An apparatus as claimed in claim 8, wherein the first threshold is a specified percentage of a period of the load current signal.

11. The apparatus as claimed in claim 10, wherein the specified percentage is approximately 75%.

12. An apparatus as claimed in claim 1, wherein the first threshold is a specified percentage of a period of the load current signal.

13. An apparatus as claimed in claim 12, wherein the specified percentage is approximately 75%.

14. An apparatus as claimed in claim 1, wherein the selector is to switch, when in use, between control of the form of the output signal by the first output controller and the second output controller in response to the load current pulse time exceeding the first threshold for a specified number of consecutive occasions.

15. An apparatus as claimed in claim 1, wherein the selector is to switch, when in use, between control of the form of the output signal by the first output controller and the second output controller further in response to a relationship between a pulse frequency modulation switching period of the load current signal and a second threshold.

16. A method as claimed in claim 5, wherein the first threshold is a specified percentage of a period of the load current signal.

17. A method as claimed in claim 16, wherein the specified percentage is approximately 75%.

18. A method as claimed in claim 5, wherein selecting between control of the form of the output signal in accordance with the first voltage regulation scheme and the second voltage regulation scheme comprises selecting between control of the form of the output signal in accordance with the first voltage regulation scheme and the second voltage regulation scheme in response to the load current pulse time exceeding the first threshold for a specified number of consecutive occasions.

19. A method as claimed in claim 5, wherein selecting between control of the form of the output signal in accordance with the first voltage regulation scheme and the second voltage regulation scheme is further in response to a relationship between a pulse frequency modulation switching period of the load current signal and a second threshold.

* * * * *